Nov. 17, 1936. E. G. CARROLL 2,060,853
AUTOMOBILE BRAKE
Original Filed April 14, 1928
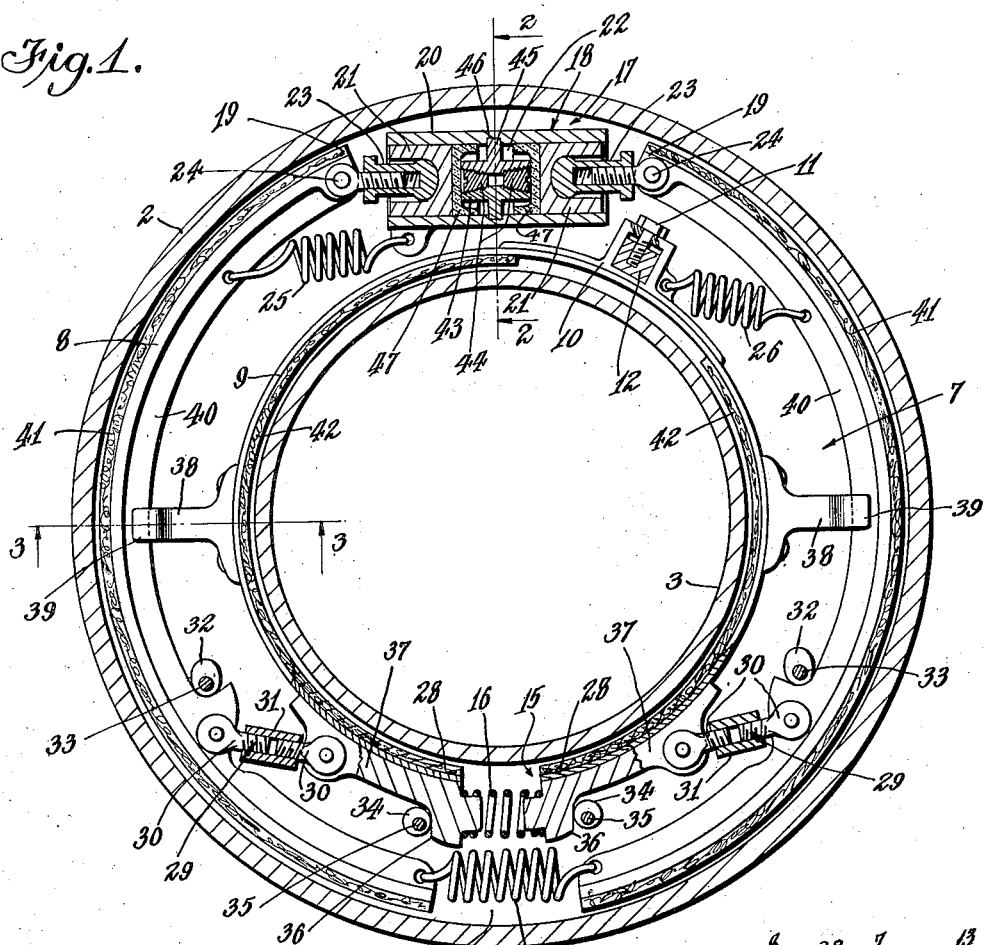
Inventor
Eugene G. Carroll
By Lyon & Lyon
Attorneys Patented Nov. 17, 1936

2,060,853

UNITED STATES PATENT OFFICE 2,060,853

AUTOMOBILE BRAKE

Eugene G. Carroll, Los Angeles, Calif., assignor, by mesne assignments, to Bendix Brake Company, South Bend, Ind., a corporation of Illinois Application April 14, 1928, Serial No. 269,941
Renewed July 29, 1932

20 Claims. (Cl. 188—152)

This invention relates to brakes and while the invention may be used as a brake for any purpose whatever, it is expected to be especially useful when applied in the construction of automobile brakes. The requirements for automobile brakes are such that they must have sufficient power to stop the automobile in a relatively small space and this has led to the introduction of four-wheel brakes, one of the advantages of which is that the braking area is greatly increased. With heavy automobiles, and particularly with loaded trucks, it has been found in practice that even with the ordinary form of four wheel brakes it is difficult to provide sufficient area to stop the truck in a short space on account of the momentum of the heavy truck and its load.

The general object of this invention is to provide an automobile brake particularly adapted for use with heavy pleasure cars and trucks.

The braking area on each wheel will be greatly increased. In its preferred embodiment, the invention involves the use of a brake drum with two separated braking faces of different diameters, each of which has its corresponding brake band, and one of the objects of the invention is to provide simple means for mounting the two brake bands and for connecting the same so that when the braking force is applied to one of the brake bands, it will be imparted to the other brake band.

A further object of the invention is to provide a simple means for maintaining the brake bands out of contact with the braking faces with which they cooperate and to provide simple means for regulating the position of rest of each brake band so as to control the amount of movement necessary to bring the brake into application against the braking face.

One of the objects of the invention is to provide a brake of this type which is particularly adapted for use with hydraulic means for applying the brakes.

Further objects of the invention will appear hereinafter.

The invention consists of the novel parts and combination of parts to be described hereinafter, all of which contribute to produce an efficient automobile brake.

A preferred embodiment of the invention is described in the following specification, while the broad scope of the invention is pointed out in the appended claims.

In the drawing:

Figure 1 is a vertical cross section through a brake drum and brake embodying my invention.

Figure 2 is a section taken about on the line 2—2 of Figure 1 and showing a short portion of a spoke of the wheel, the remainder of the drum being broken away.

Figure 3 is a cross section taken about on the line 3—3, of Fig. 1.

In practicing the invention, I provide a brake drum with two braking faces. This is preferably accomplished by constructing the brake drum with two annular braking faces of different diameters. In other words, the brake drum is of channel form in cross section (see Fig. 2), the bottom or web 4 of the channel being secured by bolts 5 to the spokes 6 of the wheel. The brake shoes or brake bands are constructed so that they lie in the annular space 7 between the flanges 2 and 3. In order to accomplish this, I provide an outer, or main brake band 8 of relatively large diameter which cooperates with the inner face of the flange 2 and I provide an inner brake band 9 of smaller diameter to cooperate with the flange 3. The brake band 8 may be described as an "inside" or expanding brake band, whereas, the brake band 9 may be described as "outside" or constricting brake band.

Either of the brake bands may be supported on the brake housing but I prefer to support the smaller brake band 9 which, for this purpose, is provided with a bracket 10 on its upper side, which bracket is secured by a screw 11 into an anchor bar 12 projecting from the side of the brake housing 13. This housing is of annular form and provided with flanges 14 which project over the edges of the flanges 2 and 3 so that the housing forms a cover for the brake drum.

The brake band 9 has a gap 15 formed on its under side at which point a compression coil spring 16 is provided for releasing the band and normally holding it out of contact with the flange 3.

The larger band 8 is formed of two sections, gaps 17 being provided at the upper and lower sides of the band. In the upper gap 17, I provide an expansion device 18 of any suitable construction for forcing the ends 19 of this brake band apart to expand this brake band on the inner side of the flange 2. Any suitable expanding device may be employed. In the present instance, I have illustrated a hydraulic brake cylinder 20 which may be bolted to the inner face of the housing 13, (see Fig. 2). This cylinder has two plungers 21 which will be moved apart by hydraulic pressure when a liquid under pressure is admitted into the space 22 between the plungers. The outer faces of the plungers are provided with sockets to receive the rounded ends of adjustable strut links 23, the outer ends of which are attached by pivots 24 to the ends 19 of the sections of this band.

Coil springs 25 and 26 are provided at the upper side of the band 8 and a similar coil spring 27 is provided on the under side of this band all three springs serving to release the band from contact with the drum and normally to hold the band in its released or "off" position. The coil spring 25 is attached at one end to the inner side of the band 8 near one end 19 and has its other end attached to a lug on the end of the barrel or cylinder 20. The spring 26 is connected at one end to the inner side of the other section of the band and at its other end, on the bracket 10 near the anchoring stud 12.

A connection is provided between the two bands so that when the main band 8 is expanded, the ends 28 of the smaller band will be thrust in a direction to move them toward each other. For this purpose, I provide two adjustable strut links 29 which are attached in an inclined position at the under side of the band 9.

Each of the strut links 29 consists of two pivoted eye bolts 30 threaded in opposite directions and connected by a turn buckle 31. Although the spring 27 is exerting its force in a direction to pull the sides of the brake band 8 inwardly, it will be evident that by reason of the inclined position of the strut links 29, that when the expanding force operates on the band 8 and the band having contacted with the drum is rotated slightly thereby, one of these links 29 will tend to swing downwardly at its outer end, thereby pressing or applying the band 8 to its flange. At the same time, the thrust in this link will tend to close the gap at 15 and wrap the smaller band 9 on its flange.

Any suitable means may be provided for adjusting the position of rest of the brake bands with respect to their corresponding flanges. This feature of the brake is important, because it will determine the length of time or the amount of movement necessary to set the brakes. For adjusting the outer band 8, I provide two cams 32 mounted on bolts 33. These bolts 33 should be tight in the housing 13 so that the cams will stay in any position in which they are left. In this connection, it should be understood that there is no great strain on the cams as they do not have to resist any of the forces developed in applying the brakes. They only hold the brake band at a predetermined distance from the corresponding brake flange.

In order to regulate the position of rest of the band 9, I provide a similar pair of cams 34 mounted on bolts 35 that fit tight in the housing 13. The cams 34 thrust against the outwardly projecting toes 36 which are formed on the brackets 37 attached to the ends 28 of the band 9. The ends of the thrust links 30 may be pinned to these brackets 37.

In order to keep the band 8 in position on its flange 2, I provide two guide brackets 38 that are located on opposite sides of the band. One of these guide brackets is illustrated in Figure 3. Its outer end is provided with two forks 39 between which a bead 40 on the band 8 lies. The forks 39 evidently will keep the band 8 from shifting laterally.

The brake bands 8 and 9 should be provided with suitable brake linings 41 and 42, respectively.

The brake cylinder 20 is provided with a stop for limiting the inward movement of the plungers 21. For this purpose a split block 43 may be provided. This block is split on the axis of the barrel or cylinder 20 and its ends are provided with conical threaded sockets to receive expansion plugs 44. By reason of the taper of these plugs it will be evident that when they are screwed into place, they will expand the block 43 in such a way that a central collar 45 on the block may be forced outwardly into the groove 46 extending around on the interior of the cylinder at its middle point. In this way, the stop may be secured in place. The inner ends of the plungers are provided with cup leathers 47 of common form.

Although I prefer to operate this brake by hydraulic means, it will be evident that any kind of expansion device can be employed instead of hydraulic cylinder 20.

In the operation of the brake, when the liquid under pressure is admitted through a pipe connection 48 (see Fig. 2) to the interior of the cylinder, the plungers 21 will be forced outwardly. This will expand the band 8 causing a thrust force to be exerted through at least one of the inclined links 30.

This will wrap the band 9 on the inner flange 3 and apply it to its flange; the reaction of the application causes a downward swinging movement of the outer ends of the strut links 30 which will move the outer band 8 against the inner face of the flange 2.

When the braking force ceases, the springs 16, 25, 26, and 27 will release the brake bands.

The cams 32 and 34 enable the position of the brake bands, with respect to their corresponding flanges, to be nicely regulated.

It is understood that the embodiment of the invention described herein is only one of the many embodiments this invention may take, and I do not wish to be limited in the practice of the invention, nor in the claims, to the particular embodiment set forth.

What I claim is:

1. In a brake for automobiles and the like, the combination of a brake drum having a pair of annular brake faces of different diameters with a space therebetween, an outer brake band in the annular space to cooperate with the braking face of larger diameter, a second brake band to cooperate with the braking face of smaller diameter, means for applying a force to one of the brake bands to apply the same to its braking face, strut links connecting the bands for imparting the braking movement to the other band, and means for holding both of said brake bands normally out of contact with their corresponding brake faces.

2. In a brake for automobiles and the like, the combination of a brake drum having a pair of annular flanges of different diameters with a space therebetween, an outer brake band to cooperate with the inner face of the flange of larger diameter, an inner brake band to cooperate with a face of the flange of smaller diameter, means for applying an expanding force to the first named brake band to press the same against the inner face of its corresponding flange, and means located at two points between the brake bands for connecting the bands and for imparting thrust forces developed by the outer band to the inner band.

3. In a brake for automobiles and the like, the combination of a brake drum having a pair of annular brake flanges of different diameters with an annular space between the same, a brake band cooperating with the outer face of the flange of smaller diameter, and having a gap in its periphery, a rake band cooperating with the inner face of the brake flange of larger diameter, means for anchoring the first named brake band near its upper side, and so that the said gap in the band is on the underside of the brake drum, thrust members connecting the anchored brake band with the larger brake band operating to apply the smaller brake band when the braking force is applied to the larger brake band, and means for applying braking force to expand the larger brake band.

4. In a brake for automobiles and the like, the combination of a brake drum having a pair of annular brake flanges of different diameters with an annular space between the same, a brake band cooperating with the outer face of the flange of smaller diameter, and having a gap in its periphery, a brake band cooperating with the inner face of the brake flange of larger diameter, means for anchoring the first named brake band near its upper side, and so that the said gap in the band is on the underside of the brake drum, thrust members connecting the anchored brake band with the larger brake band operating to apply the smaller brake band when the braking force is applied to the larger brake band, means for applying braking force to expand the larger brake band, and springs associated with the said bands for holding the same normally out of contact with their corresponding flanges.

5. In a brake for automobiles and the like, the combination of a brake drum having a pair of annular brake flanges of different diameters with a space therebetween, a relatively small brake band with means for anchoring the same on its upper side, cooperating with the flange of smaller diameter, said brake band having a gap on its under side with a spring at the gap for normally holding the brake band out of contact with its flange, the relatively large brake band to cooperate with the inner face of the flange of larger diameter having a gap at its upper side with an expansion device located in the gap, inclined thrust members connecting the said brake bands so that the braking force applied on the outer band is imparted to the smaller band to apply the same to its flange, and means for normally holding the brake band out of contact with their corresponding brake flanges.

6. In a brake for automobiles and the like, the combination of a brake drum having a pair of annular brake flanges of different diameters with an annular space between same, a brake band co-operating with the outer face of the flange of smaller diameter, and having a gap in its periphery, a brake band cooperating with the inner face of the brake flange of larger diameter, means for anchoring the first named brake band near its upper side, and so that the said gap in the band is on the under side of the brake drum, thrust members connecting the anchored brake band with the larger brake band operating to apply the smaller brake band when the braking force is applied to the larger brake band, means for applying braking force to expand the larger brake band, springs associated with the said bands for holding the same normally out of contact with their corresponding flanges, and adjustable stops for regulating the position of the brake bands when in their condition of rest.

7. In a brake for automobiles and the like, the combination of a brake drum having a pair of annular brake flanges of different diameters with an annular space between the same, an outer brake band co-operating with the inner face of the outer flange and having sections with a gap between the same, means located opposite the gap for expanding the said sections to apply the brake band, an inner brake band co-operating with the flange of smaller diameter on its outer face and having a gap located adjacent the gap of the first named band, and connections between the outer band and the inner band for exerting a thrust force from the outer band to the inner band.

8. In a brake for automobiles and the like, the combination of a brake drum having a pair of annular brake flanges of different diameters with an annular space between the same, an outer brake band co-operating with the inner face of the outer flange and having sections with a gap between the same, means located opposite the gap for expanding the said sections to apply the brake band, an inner brake band cooperating with the flange of smaller diameter on its outer face and having a gap located adjacent the gap of the first named band, connections between the outer band and the inner band for exerting a thrust force from the outer band to the inner band, a tensile spring connecting the sections of the outer band at its gap for holding it off of its flange, and a compression spring in the gap of the other band for holding it off of its flange.

9. In a brake for automobiles and the like, the combination of a brake drum having a pair of annular brake flanges of different diameters with an annular space between the same, an outer brake band co-operating with the inner face of the outer flange and having sections with a gap between the same, means located opposite the gap for expanding the said sections to apply the brake band, an inner brake band co-operating with the flange of smaller diameter on its outer face and having a gap located adjacent the gap of the first named band, connections between the outer band and the inner band for exerting a thrust force from the outer band to the inner band, a tensile spring connecting the sections of the outer band at its gap for holding it off of its flange, a compression spring in the gap of the other band for holding it off of its flange, and adjustable stops co-operating with the sections of the outer band for limiting the movement of the same away from its braking flange.

10. In a brake for automobiles and the like, the combination of a brake drum having a pair of annular brake faces, a brake band to cooperate with one brake face, a brake band to cooperate with the other brake face, means for applying a brake applying force to the first named brake band to press the same against its corresponding brake face, and means pivotally secured to both bands for imparting thrust forces developed by the first named band to the last named band.

11. In a brake for automobiles and the like, the combination of a brake drum having a pair of annular brake faces of different diameters with a space between the same, an outer brake band to cooperate with the braking face of larger diameter, a second brake band to cooperate with the braking face of the brake flange of smaller diameter, means for applying force to one of the brake bands to apply the same to its associated brake face and link means directly and pivotally connected at one end to one band and similarly connected at the other end to the other band.

12. In a brake for automobiles and the like, the combination of a brake drum having a pair of annular brake flanges of different diameters with an annular space between the same, a brake band cooperating with the outer face of the flange of smaller diameter, a brake band cooperating with the inner face of the brake flange of larger diameter, means for anchoring one brake band, thrust members connecting the anchored brake band with the other brake band, and means for applying braking force to expand said other brake band.

13. In a brake for automobiles and the like, the combination of a brake drum having a pair of annular brake faces, a brake band cooperating with one face and having sections with a gap between the same, means for expanding the said sections to apply the brake band, another brake band cooperating with the other face and having a gap, and a link pivotally secured to the outer band and the inner band for exerting a thrust force from the outer band to the inner band.

14. In a brake for automobiles and the like, the combination of a brake drum having a pair of annular brake faces of different diameters with an annular space between the same, a brake band cooperating with one face and having sections with a gap between the same, means located opposite the gap for applying the brake band, another brake band cooperating with the face of smaller diameter and having a gap located adjacent the gap of the first named band, connections between the bands for exerting a thrust force from one band to the other band, a tension spring connecting the sections of one band at its gap for holding it off of its flange, and a compression spring in the gap of the other band for holding it off of its flange.

15. In a brake for automobiles and the like, the combination of a brake drum having a pair of annular brake faces, a brake band cooperating with one face, another brake band cooperating with the other face, and a compression member connected directly to one band at one end and to the other band at the other end for exerting a thrust force from one band to the other band.

16. In a brake for automobiles, a friction braking element, another brake element associated therewith and movable relative thereto, a guide ridge being formed on one of said elements and a fork secured to the other element whereby the elements may move freely longitudinally relative to each but are restrained against relative lateral movement.

17. The combination with a brake drum, of a brake shoe located within the drum, a reciprocatory actuator arranged in substantial alignment with one end of the shoe in spaced relation thereto, means establishing an operative connection between the actuator and shoe including a member reciprocably mounted within the actuator and normally held from rotation, and a nut threaded upon said member intermediate the shoe and actuator in abutting relation to the latter for varying the effective length of the connection between the actuator and shoe.

18. The combination with a brake drum, of a brake shoe therein, an actuating member for the shoe, means establishing an operative connection between the actuator and shoe including a member having the opposite end portions loosely engageable with the actuator and shoe permitting the same to be readily assembled with and removed from the latter, and means upon said member between the actuator and shoe for varying the effective length of the connection therebetween.

19. The combination with a brake drum, of a brake shoe therein, an actuating member for the shoe, an adjusting device disposed between the actuator and shoe, said device including a member having one end freely sleeved within the adjacent end of the actuator and having the opposite end loosely and non-rotatably engageable with the shoe, and means upon the member intermediate the shoe and actuator for varying the space therebetween.

20. The combination with a brake drum and brake friction means within the drum, of an actuator for the brake friction means comprising a reciprocable plunger, an adjusting device interposed between the plunger and brake friction means and comprising, a member movable freely relative to said plunger and operatively connected to the brake friction means, and a second member adjustable longitudinally of the member aforesaid and adapted to abut said plunger.

EUGENE G. CARROLL.